United States Patent
Paget (10) Patent No.: US 7,531,124 B2
(45) Date of Patent: May 12, 2009

(54) ONE-PIECE BLOW MOLD HALVES FOR MOLDING A CONTAINER

(75) Inventor: Tony Paget, Grimsby (CA)

(73) Assignee: Garrtech Inc., Stoney Creek, Ontario (CA)

( * ) Notice: Subject to any disclaimer, the term of this patent is extended or adjusted under 35 U.S.C. 154(b) by 0 days.

(21) Appl. No.: 11/676,371

(22) Filed: Feb. 19, 2007

(65) Prior Publication Data

US 2008/0166444 A1      Jul. 10, 2008

(30) Foreign Application Priority Data

Jan. 8, 2007     (CA) .................................... 2573336

(51) Int. Cl.
*B29C 49/48*     (2006.01)
*B29C 49/52*     (2006.01)

(52) U.S. Cl. .................. 264/509; 264/523; 264/536; 409/131; 425/522; 425/525; 425/470

(58) Field of Classification Search ................ 425/522, 425/525, 470; 264/509, 523, 536; 409/131
See application file for complete search history.

(56) References Cited

U.S. PATENT DOCUMENTS

| 3,359,861 | A | * | 12/1967 | Johnson et al. | ............. | 409/211 |
| 5,383,779 | A | * | 1/1995 | Robinson | .................... | 425/525 |
| 6,447,281 | B1 | * | 9/2002 | Petre | .......................... | 425/195 |

OTHER PUBLICATIONS

Rosato, Blow Molding Handbook, p. 199, Oxford University Press 1989.*

* cited by examiner

*Primary Examiner*—Robert B Davis
(74) *Attorney, Agent, or Firm*—Baker & Daniels LLP (57) ABSTRACT

A blow mold is disclosed. The mold comprises a pair of mold halves having an operative configuration wherein said mold halves together define a cavity for a container. The container has a main body and a characteristic selected from the group of characteristics consisting of: a push-up base; an integral finish; and an embossed or a debossed feature. Each of the pair of mold halves has a first portion and a second portion formed integrally with the first portion. When the pair of mold halves is in the operative configuration, the first portions collectively define the main body and the second portions collectively define the characteristic. The blow mold can be used for prototyping, and can also be used for production.

17 Claims, 8 Drawing Sheets

ONE-PIECE BLOW MOLD HALVES FOR MOLDING A CONTAINER

FIELD OF THE INVENTION

The invention relates to the field of blow molding.

BACKGROUND OF THE INVENTION

Blow molding is a process commonly used for producing hollow plastic objects. A typical blow molding operation involves mold halves which are closed about an extruded parison of warm plastic and the introduction of air into the closed-off parison to cause same to conform to the shape of the mold cavity. After the plastic has cooled, the mold halves are separated to release a molded product. The mold halves are typically provided with interior conduits through which heat carrying medium is circulated, to heat or cool the mold as necessary in the particular application.

Containers for consumer products are often provided with features such as finishes (threaded necks which receive caps) and "push-ups" or "Champagne" bases (hollows formed in the bases of the containers to provide stability). Historically, portions of the mold halves which define these features in the finished container are defined by inserts which are machined separately from the remainder of the mold and then secured thereto.

Inserts are also used to apply details such as dates, logos and codes to the surface of the molded product, to achieve small variations in the shape of the molded product without the requirement of manufacturing an entirely new mold and, when machined out of harder material than the remainder of the mold, to provide enhanced wear resistance to portions of the mold that can benefit therefrom.

By segmenting the mold halves, mold cavities of very complex shapes can be routinely constructed using conventional three-dimensional milling machinery, as is generally available in mold-making shops.

SUMMARY OF THE INVENTION

A blow mold forms two aspects of the invention.

In one of such aspects, the blow mold comprises a pair of mold halves having an operative configuration wherein said mold halves together define a cavity for a container, the container having a main body and a characteristic. The characteristic is selected from the group of characteristics consisting of: a push-up base; an integral finish; and an embossed or debossed feature. Each of the pair of mold halves has a first portion and a second portion formed integrally with the first portion. When the pair of mold halves is in the operative configuration, the first portions collectively define the main body and the second portions collectively define the characteristic.

In the second of such aspects, the blow mold comprises: a pair of mold halves having an operative configuration wherein said mold halves together define a cavity for a container, the container having a main body, a push-up base and an integral finish. Each of the pair of mold halves has a first portion, a second portion formed integrally with the first portion and a third portion formed integrally with the first portion. When the pair of mold halves is in the operative configuration, the first portions collectively define the main body, the second portions collectively define the push-up base and the third portions collectively define the finish.

A method of producing a prototype container with the blow-mold forms another aspect of the invention. This method comprises the steps of: providing a quantity of warm plastic having an interior void; providing the mold such that the quantity of plastic is disposed inside the cavity; introducing air into the void to conform the plastic to the shape of the cavity; allowing the plastic to harden to produce a molded article selected from the group consisting of the prototype container and a precursor product adapted to be trimmed to produce the prototype container; and opening the mold to release the molded article.

A method of producing the mold forms a further aspect of the invention. This method comprises the steps of: providing a piece of metal for each of the pair of mold halves; and machining the first portion and the second portion out of the billet using a simultaneous 5 axis milling machine.

Use of the mold for production of a prototype container forms yet another aspect of the invention.

By avoiding segmentation in the mold half, the mold design is simplified, as a great deal of effort is typically expended to ensure that the various components align properly with one another upon assembly. This permits molds to be constructed relatively quickly, as compared to segmented molds, and at lower costs. Heat transfer performance is also enhanced over segmented molds, as the thermal breaks formed by the junctions of aligned parts are eliminated.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter being briefly described hereinbelow.

DETAILED DESCRIPTION

Figure 1:
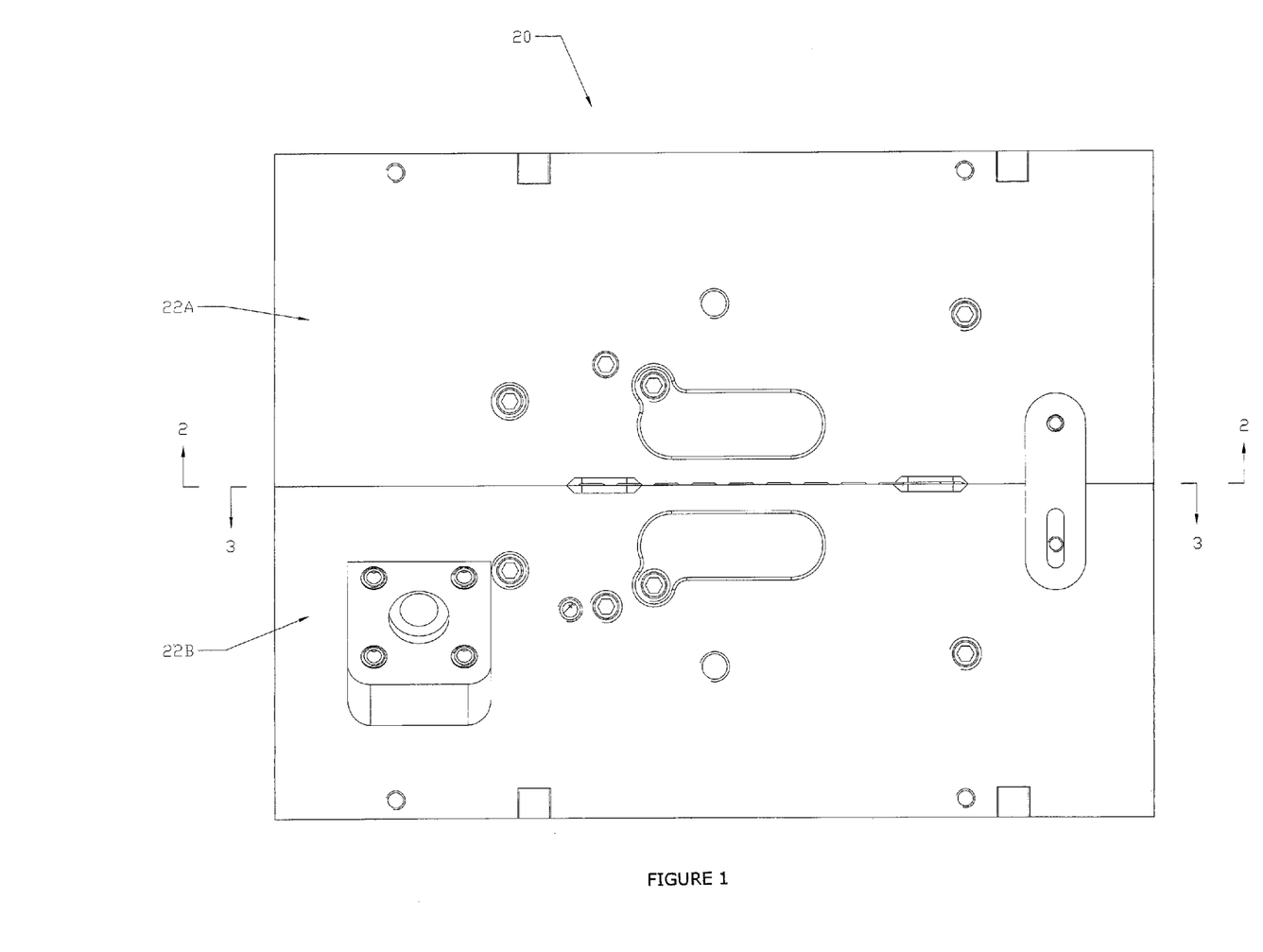
FIG. 1 is a side view of a blow-mold according to a preferred embodiment of the invention, the mold being shown in an operative configuration thereof.
Figure 2:
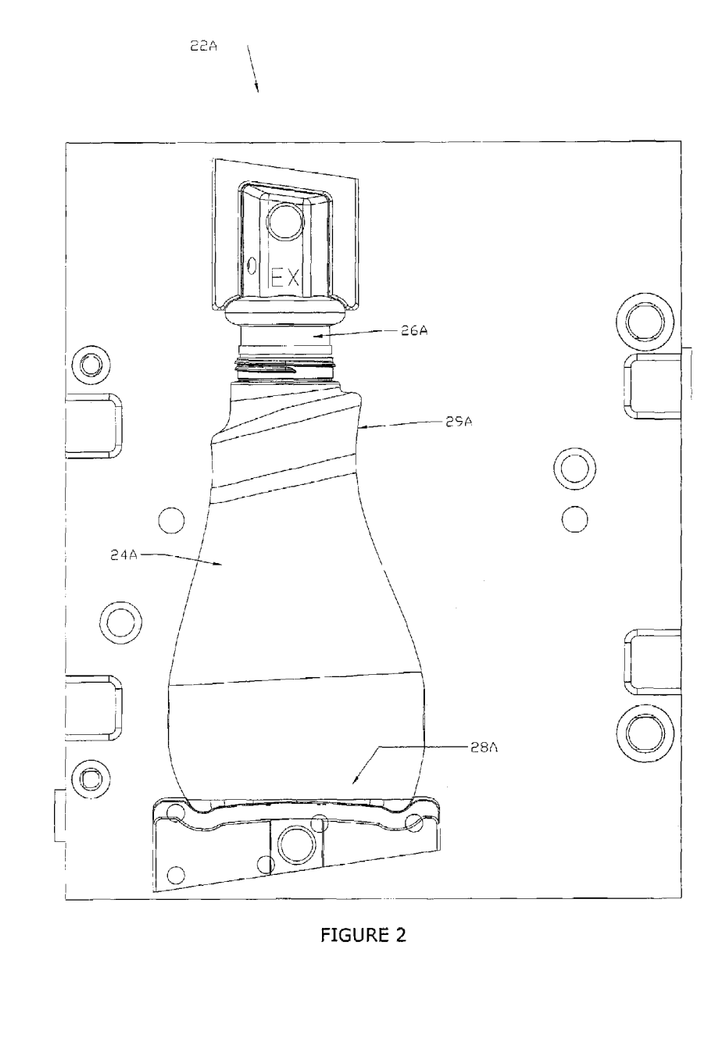
FIG. 2 is a view along section 2-2 of FIG. 1, showing the pin half of the mold.
Figure 3:
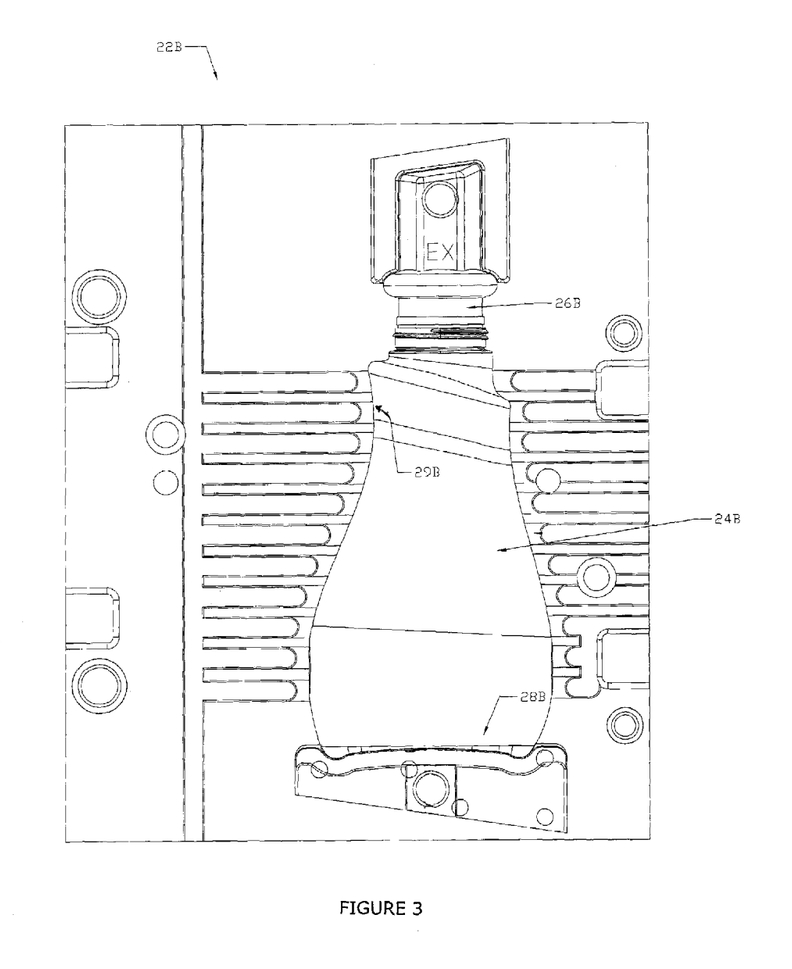
FIG. 3 is a view along section 3-3 of FIG. 1, showing the bush half of the mold.

An exemplary blow-mold constructed according to the preferred invention is illustrated in FIGS. 1-3 and designated with general reference numeral 20. This blow-mold 20 comprises a pair of mold halves 22A,22B. As illustrated, each half 22A,22B includes a first portion 24A,24B, a second portion 26A,26B, a third portion 28A,28B and a fourth portion 29A, 29B.

Figure 4:
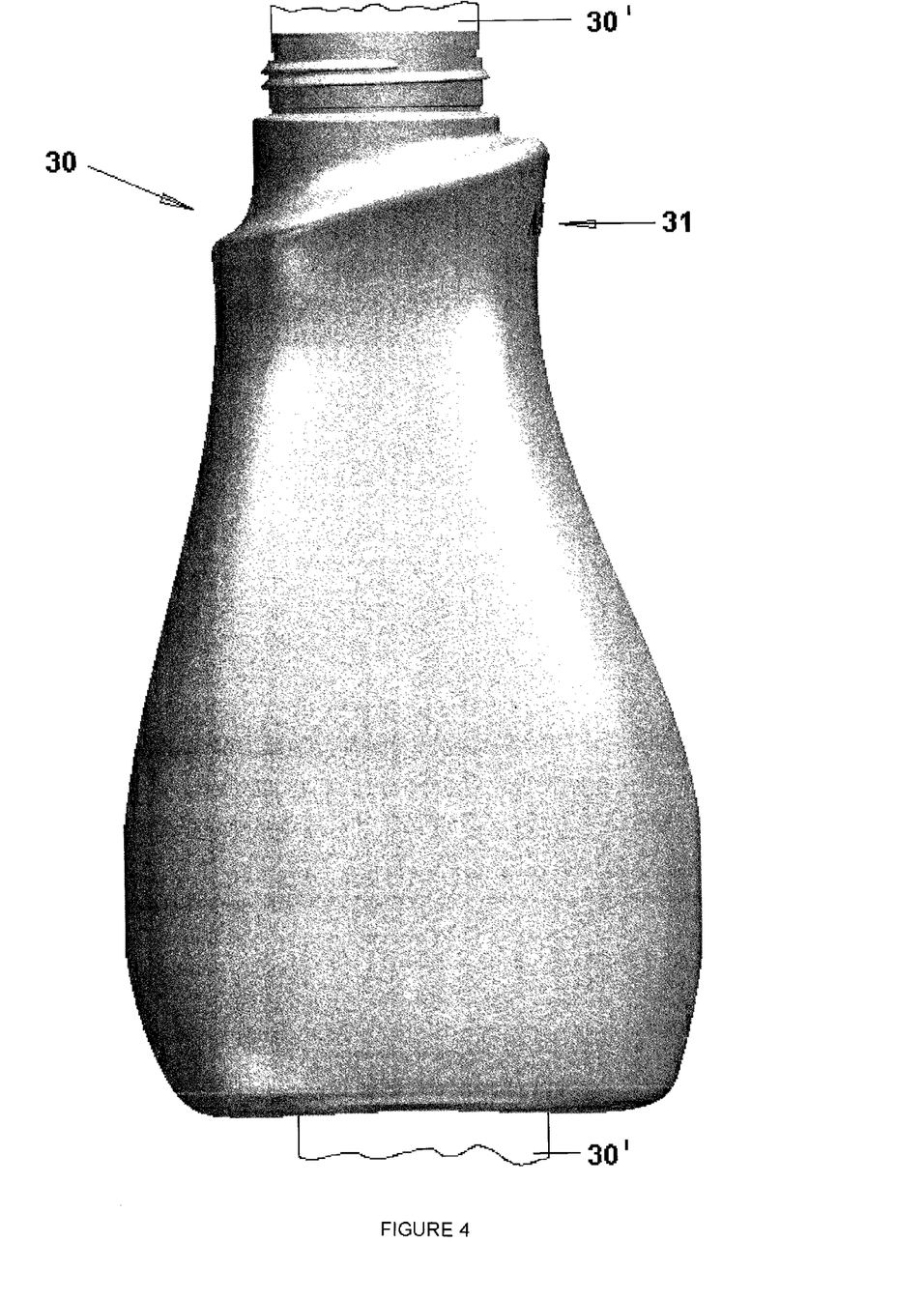
FIG. 4 is a side view of a molded precursor product produced with the mold of FIGS. 1-3.
Figure 5:
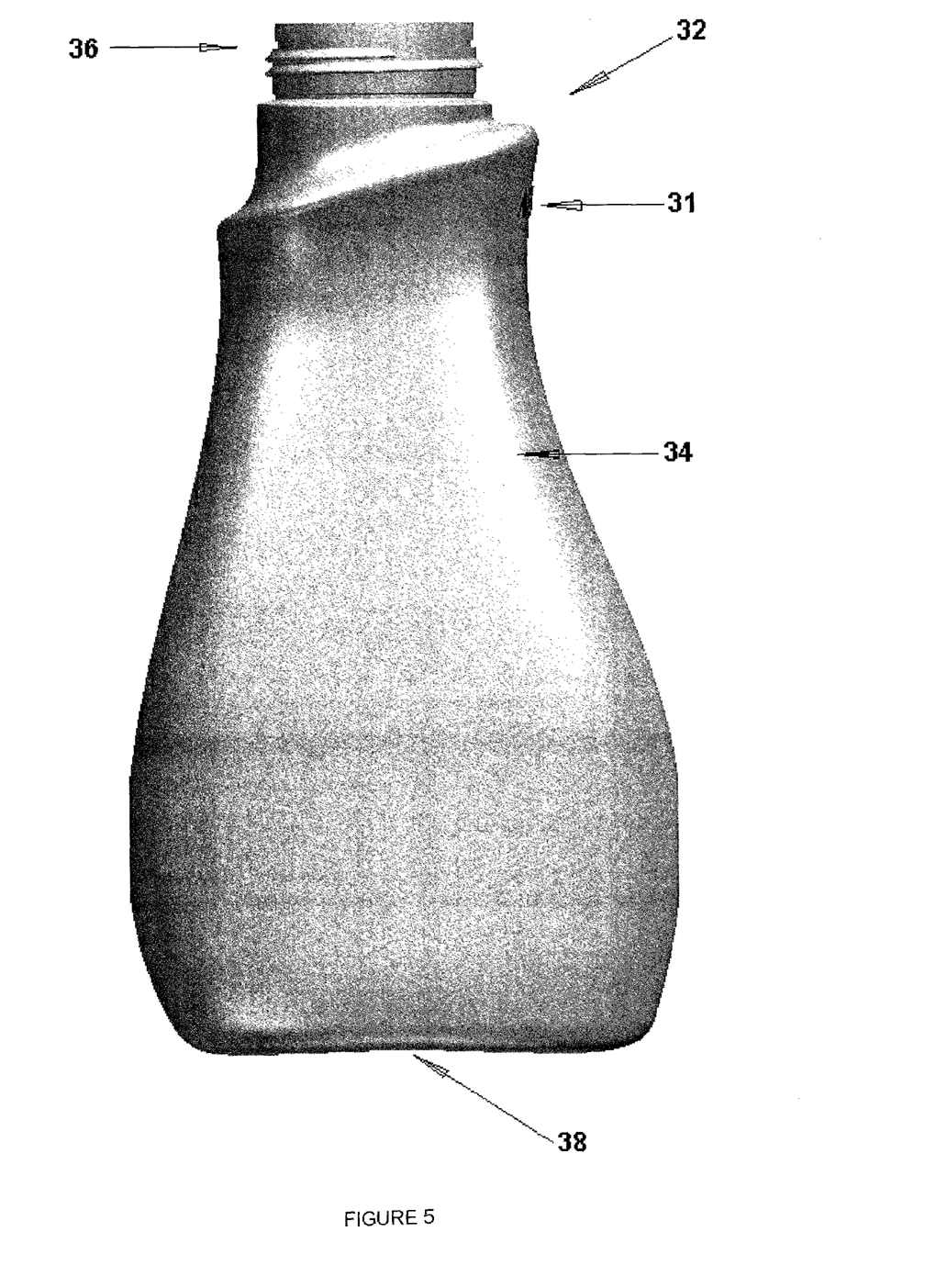
FIG. 5 is a view similar to FIG. 4 of the product of FIG. 4 trimmed for use.
Figure 6:
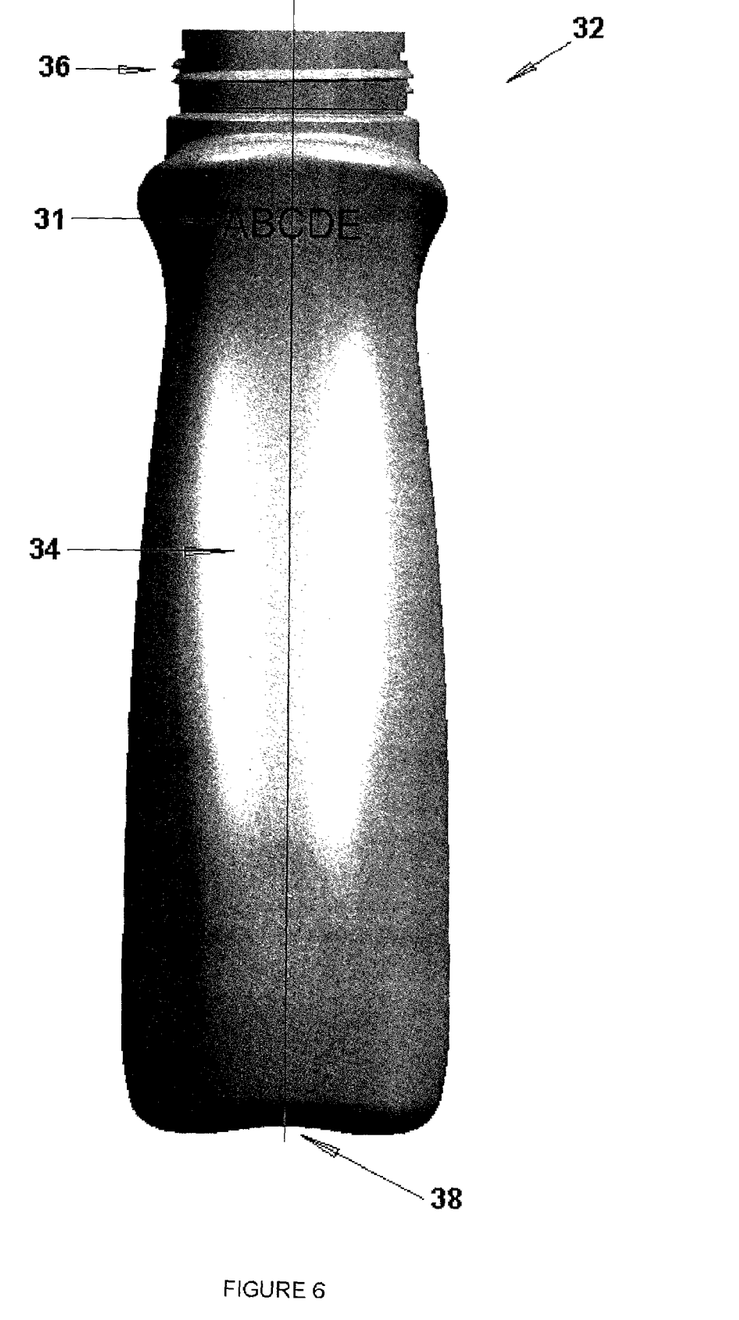
FIG. 6 is an end view of the product of FIG. 5.
Figure 7:
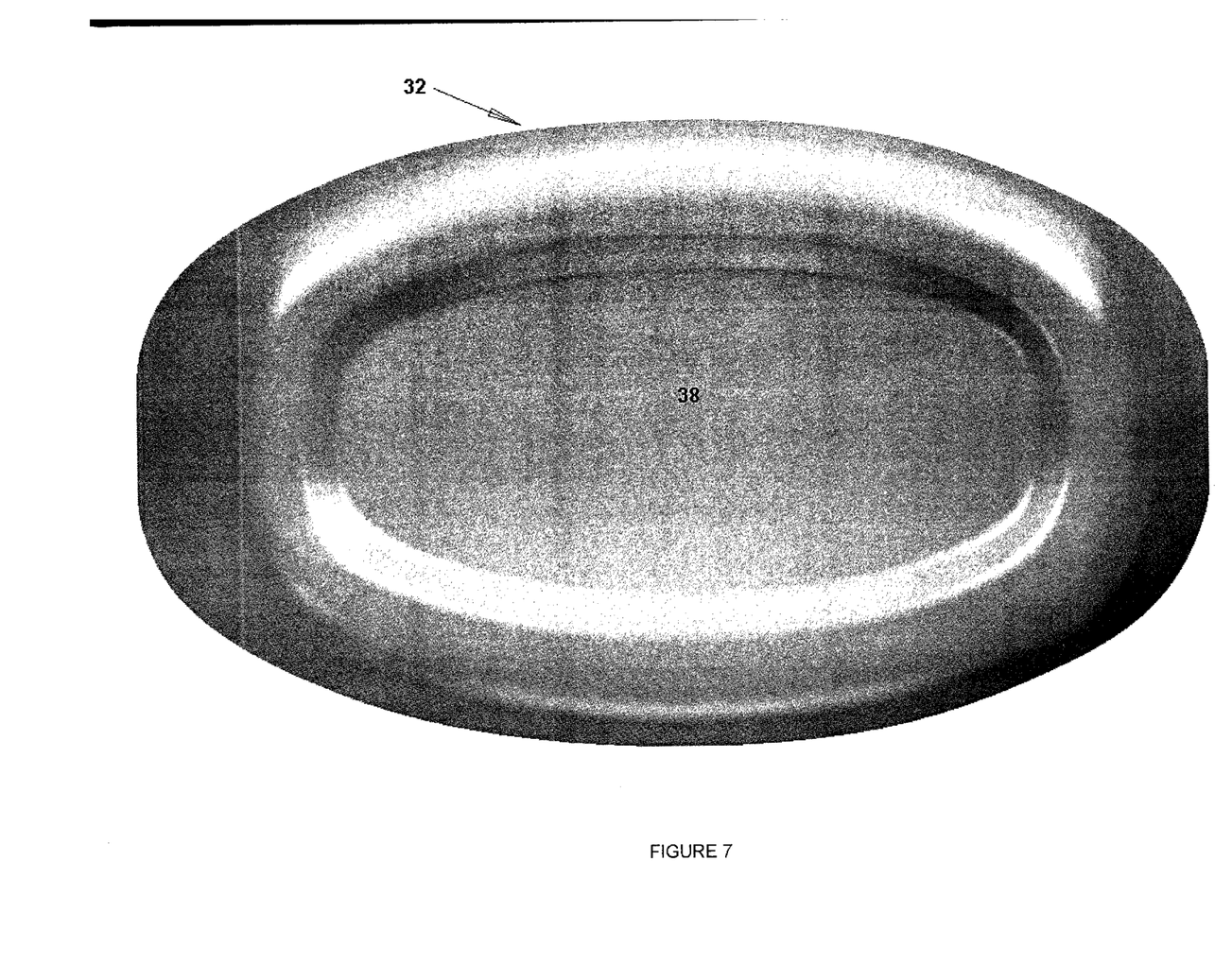
FIG. 7 is a bottom view of the product of FIG. 5.
Figure 8:
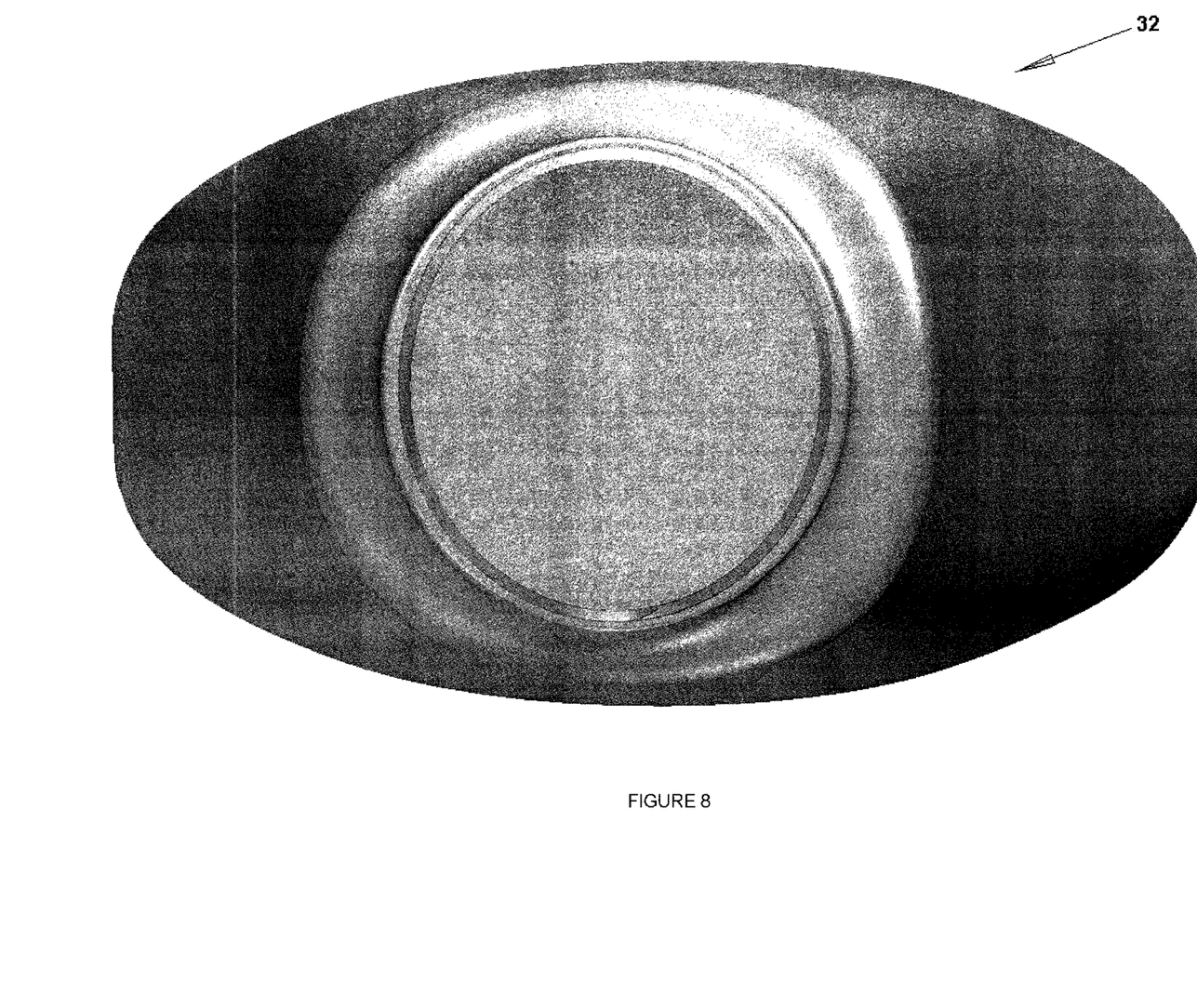
FIG. 8 is a top view of the product of FIG. 5.

Although not shown, it should be understood that, in use, these mold halves 22A,22B are fitted to a conventional blow molding machine, of the type which extrudes a parison of warm plastic, and the halves 22A,22B are closed around the parison so as to provide a quantity of warm plastic having a void in the cavity. Thereafter, air is introduced via a needle or blow pin into the void to conform the plastic to the shape of the cavity, the resin is permitted to cool and harden to produce a molded article 30 as shown in FIG. 4 and the mold is opened to release the article. With the exception of the construction of the mold itself, all of the foregoing is conventional and as such is neither described in detail nor illustrated.

The article 30 will be seen to be a precursor product, with waste flash 30' which is trimmed in a conventional manner to produce a prototype container 32 as shown in FIGS. 5-8 having a main body 34 defined by the first portions 24A,24B of the mold 20, a push-up base 38 defined by the second portions 28A,28B of the mold 20, an integral threaded finish 36 defined by the third portions 26A,26B of the mold 20 and an embossed feature 31 defined by the fourth portions 29A, 29B.

This mold 20 differs from molds of the prior art, in that each mold half 22A,22B is machined out of a single piece of aluminum metal using a simultaneous 5-axis milling machine. For the purpose of this disclosure and the claims, when two parts are indicated as being formed "integrally", it means that they are formed out of a single piece of material, the portions of said single piece of material associated with said two parts never being separated from one another during the forming process. To obtain the requisite functionality of the tooling, conventional tooling is balanced and made concentric and operated at relatively high speeds, up to 46,000 RPM.

Once a person of ordinary skill in the art is made to recognize that a simultaneous 5-axis milling machine, with improved tooling as indicated above, can be made to machine molds as contemplated herein, the actual machining operation is a matter of routine application of known principles, and as such, is not detailed herein. Similarly, it will be understood that the mold halves of the present invention include elements such as conduits for receiving coolant and threaded bores for securing the mold halves to the molding machine, which elements are also not described in view of their routine nature.

One requirement of one-piece mold-making which may not be readily appreciated by persons of ordinary skill is the requirement for venting. Whereas mold halves of the prior art are normally not airtight, by virtue of the interstices or voids that form between adjacent parts as a consequence of the multi-part construction, one-piece molds have the potential to be relatively air tight which, all things being equal, would result in incomplete expansion of the parison. To ensure complete expansion, it is necessary to provide ventilation in the mold. The inventors have found that small holes, 0.003"-0.004" in diameter, provide suitable ventilation, and leave no obvious marks on the molded article.

Whereas the product shown in FIGS. 5-8 includes as characteristics an integral threaded finish, a push-up base and an embossed feature, it should be understood that the invention is not so limited, and without limitation, should be understood as encompassing products having only one or two of such characteristics.

Further, whereas the product shown in FIGS. 5-8 is described as being produced by trimming the product of FIG. 4, it should be understood that a separate trimming step is not always required.

Yet further, whereas the product of FIGS. 5-8 is indicated to be a prototype container, it should be understood that this is not required. The invention will have great advantage in prototyping, since it allows faster turnaround in terms of mold production and also reduces costs, which can be of enhanced importance in prototyping. However, the invention can be utilized for the manufacture of production molds. In this latter case, it may be useful to machine the mold halves out of metal harder than aluminum, or to coat the wear edges of an aluminum mold with harder material after machining.

As well, whereas the description contemplates extrusion blow molding, it should be understood that the invention can be employed in the context of stretch blow molding as well as injection blow molding.

Of course, routine changes in size and shape of the container can be made and the feature can be a logo, code, insignia, etc.

Further, whereas the feature is indicated to be embossed, it could also be debossed. Further, whereas the feature shown is defined partly be each mold half, it could be defined fully by only one of the mold halves. For greater certainty, for the purpose of this disclosure and the claims, where a feature is specified as being defined "collectively" by two parts, then that feature may be defined wholly by either part, or partly by each part. In the context of the definition of container main bodies, threaded finishes and push-up bottoms, "collectively" will typically contemplate the latter.

In view of the foregoing, it will be understood that the invention is limited only by the claims appended hereto, purposively construed.

The invention claimed is:

1. A blow mold comprising:
a pair of mold halves having an operative configuration wherein said mold halves together define a cavity for a container, the container having a main body and a characteristic selected from the group of characteristics consisting of:
an integral finish; and
an embossed or a debossed feature, wherein
each of the pair of mold halves has a first portion and a second portion formed integrally with the first portion, wherein the first portion and the second portion are machined out of a piece of metal, and
when the pair of mold halves is in the operative configuration, the first portions collectively define the main body and the second portions collectively define the characteristic.

2. A mold according to claim 1, further comprising a push-up base.

3. A mold according to claim 1, wherein the characteristic is an integral finish.

4. A mold according to claim 1, wherein the characteristic is an embossed or a debossed feature.

5. A mold according to claim 1, wherein the mold is a prototype mold.

6. A mold according to claim 1, wherein the mold is a production mold.

7. A blow mold comprising:
a pair of mold halves having an operative configuration wherein said mold halves together define a cavity for a container, the container having a main body, a push-up base and an integral finish, wherein
each of the pair of mold halves has a first portion, a second portion formed integrally with the first portion and a third portion formed integrally with the first portion, wherein the first portion, the second portion and the third portion are machined out of a piece of metal,
when the pair of mold halves is in the operative configuration, the first portions collectively define the main body, the second portions collectively define the push-up base and the third portions collectively define the finish.

8. A mold according to claim 7, wherein the mold is a prototype mold.

9. A mold according to claim 7, wherein the mold is a production mold.

10. A method of producing a prototype container comprising the steps of:
- providing a quantity of warm plastic having an interior void;
- providing the mold of claim 1 such that the quantity of plastic is disposed inside the cavity;
- introducing air into the void to conform the plastic to the shape of the cavity;
- allowing the plastic to harden to produce a molded article selected from the group consisting of the prototype container and a precursor product adapted to be trimmed to produce the prototype container; and
- opening the mold to release the molded article.

11. Method according to claim 10, wherein the molded article is the prototype container.

12. Method according to claim 10, wherein the molded article is the precursor product and comprising the further step of:
- trimming the precursor product to produce the container.

13. A method of producing the mold of claim 1 comprising the steps of:
- providing a piece of metal for each of the pair of mold halves; and
- machining the first portion and the second portion out of the billet using a simultaneous 5 axis milling machine.

14. Method according to claim 13, wherein the milling machine has cutting tools that rotate at speeds of 30,000 RPM and higher during the machining step.

15. A method of producing the mold of claim 2 comprising the steps of:
- providing a piece of metal for each of the pair of mold halves; and
- machining the first portion and the second portion out of the billet using a simultaneous 5 axis milling machine.

16. A method of producing the mold of claim 3 comprising the steps of:
- providing a piece of metal for each of the pair of mold halves; and
- machining the first portion and the second portion out of the billet using a simultaneous 5 axis milling machine.

17. A method of producing the mold of claim 4 comprising the steps of:
- providing a piece of metal for each of the pair of mold halves; and
- machining the first portion and the second portion out of the billet using a simultaneous 5 axis milling machine.

\* \* \* \* \*